(12) United States Patent
Jenkins et al.

(10) Patent No.: US 10,571,624 B2
(45) Date of Patent: Feb. 25, 2020

(54) LAMINATED INPUT DEVICES

(71) Applicant: Microsoft Technology Licensing, LLC, Redmond, WA (US)

(72) Inventors: Kurt A. Jenkins, Sammamish, WA (US); Tim Large, Bellevue, WA (US); Lincoln Ghioni, Redmond, WA (US); Neil Emerton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 359 days.

(21) Appl. No.: 14/839,644

(22) Filed: Aug. 28, 2015

(65) Prior Publication Data
US 2017/0059770 A1 Mar. 2, 2017

(51) Int. Cl.
*G06F 3/02* (2006.01)
*F21V 8/00* (2006.01)

(52) U.S. Cl.
CPC ........ *G02B 6/0088* (2013.01); *G02B 6/0055* (2013.01); *G02B 6/0065* (2013.01); *G06F 3/0202* (2013.01); *H01H 2219/044* (2013.01); *H01H 2219/06* (2013.01); *H01H 2219/062* (2013.01)

(58) Field of Classification Search
CPC .... G02B 6/0016; G02B 6/0018; G02B 6/002; G02B 6/0021; G02B 6/0055; G02B 6/0076; G02B 6/0088; G06F 3/0202; H01H 2219/03–066; H01H 2219/04; H01H 2219/044; H01H 2219/054; H01H 2219/06; H01H 2219/062
See application file for complete search history.

(56) References Cited

U.S. PATENT DOCUMENTS

| 4,916,262 | A | * | 4/1990 | Jungels-Butler | ..... H01H 13/702 200/306 |
| 5,138,119 | A | * | 8/1992 | Demeo | ................ H01H 13/702 200/314 |
| 7,345,250 | B2 | | 3/2008 | Hakunti et al. | |
| 7,866,032 | B2 | | 1/2011 | Wu et al. | |
| 8,072,420 | B2 | * | 12/2011 | Murakami | .............. G06F 3/044 200/314 |
| 8,854,312 | B2 | | 10/2014 | Meierling | |
| 8,890,014 | B1 | * | 11/2014 | Chen | .................... G02B 6/0036 200/310 |

(Continued)

FOREIGN PATENT DOCUMENTS

| CN | 202419363 U | 9/2012 |
| CN | 202521384 U | 11/2012 |

(Continued)

OTHER PUBLICATIONS

Avago Tecnnologies. "Innovate Keypad Design with Light Guides and LEDs", In White Paper, Nov. 17, 2009, 14 pages.

(Continued)

*Primary Examiner* — Zheng Song
(74) *Attorney, Agent, or Firm* — Rainier Patents, P.S.

(57) ABSTRACT

The description relates to laminated input devices, such as keyboards. One example can include a laminated light-distribution assembly and a key assembly adhered in light receiving relation to the laminated light-distribution assembly as a laminated input device having a neutral axis in the light-distribution assembly.

20 Claims, 5 Drawing Sheets

(56) References Cited

U.S. PATENT DOCUMENTS

| | | | |
|---|---|---|---|
| 2007/0257822 A1* | 11/2007 | Lee | H01H 13/83 341/22 |
| 2008/0129551 A1 | 6/2008 | Gao et al. | |
| 2008/0130263 A1* | 6/2008 | Liu | G02B 6/0055 362/23.05 |
| 2008/0237011 A1* | 10/2008 | Lee | H01H 13/83 200/314 |
| 2009/0091478 A1 | 4/2009 | Chan et al. | |
| 2010/0026632 A1* | 2/2010 | Ishida | H04M 1/22 345/170 |
| 2010/0147661 A1* | 6/2010 | Takeda | H01H 13/83 200/314 |
| 2011/0168538 A1* | 7/2011 | Hwa | H01H 13/83 200/5 A |
| 2011/0267745 A1 | 11/2011 | Cheng et al. | |
| 2012/0080297 A1* | 4/2012 | Takeuchi | G06F 3/0202 200/310 |
| 2013/0021671 A1* | 1/2013 | Lee | G02B 5/02 359/599 |
| 2013/0164068 A1 | 6/2013 | Leong et al. | |
| 2013/0170246 A1 | 7/2013 | Chen | |
| 2013/0248337 A1 | 9/2013 | Hu et al. | |
| 2014/0118264 A1 | 5/2014 | Leong et al. | |
| 2014/0138230 A1* | 5/2014 | Chen | H03K 17/98 200/5 A |
| 2014/0168934 A1* | 6/2014 | Chen | H01H 13/83 362/23.03 |
| 2014/0367241 A1 | 12/2014 | Niu et al. | |
| 2015/0036314 A1* | 2/2015 | Cheng | H01H 13/83 362/23.03 |

FOREIGN PATENT DOCUMENTS

| | | |
|---|---|---|
| CN | 203773478 U | 8/2014 |
| CN | 204088139 U | 1/2015 |

OTHER PUBLICATIONS

International Search Report and Written Opinion dated Oct. 7, 2016 from PCT Patent Application No. PCT/US2016/043803, 12 pages.

Demand filed Nov. 18, 2016 and Response to the International Search Report and Written Opinion dated Oct. 7, 2016 from PCT Patent Application No. PCT/US2016/043803, 14 pages.

Second Written Opinion dated Jul. 13, 2017 from PCT Patent Application No. PCT/US2016/043803, 6 pages.

"International Preliminary Report on Patentability Issued in PCT Application No. PCT/US2016/043803", dated Oct. 17, 2017, 7 Pages.

\* cited by examiner

LAMINATED INPUT DEVICES

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to laminated input devices, such as keyboards. Consumers tend to prefer thin computing devices, especially in mobile settings. Present technologies can produce relatively thin input devices, but these input devices tend to have other characteristics that are less desired by users, such as being relatively floppy and relatively loud when used. For instance, the present technologies can result in a 'drum-like' sound being produced by vibrations (e.g., percussive effect of fingers on the device) of individual layers of the input device. The present laminated input devices can have similar dimensions but can be stiffer and quieter, among other advantages.

Figure 1:
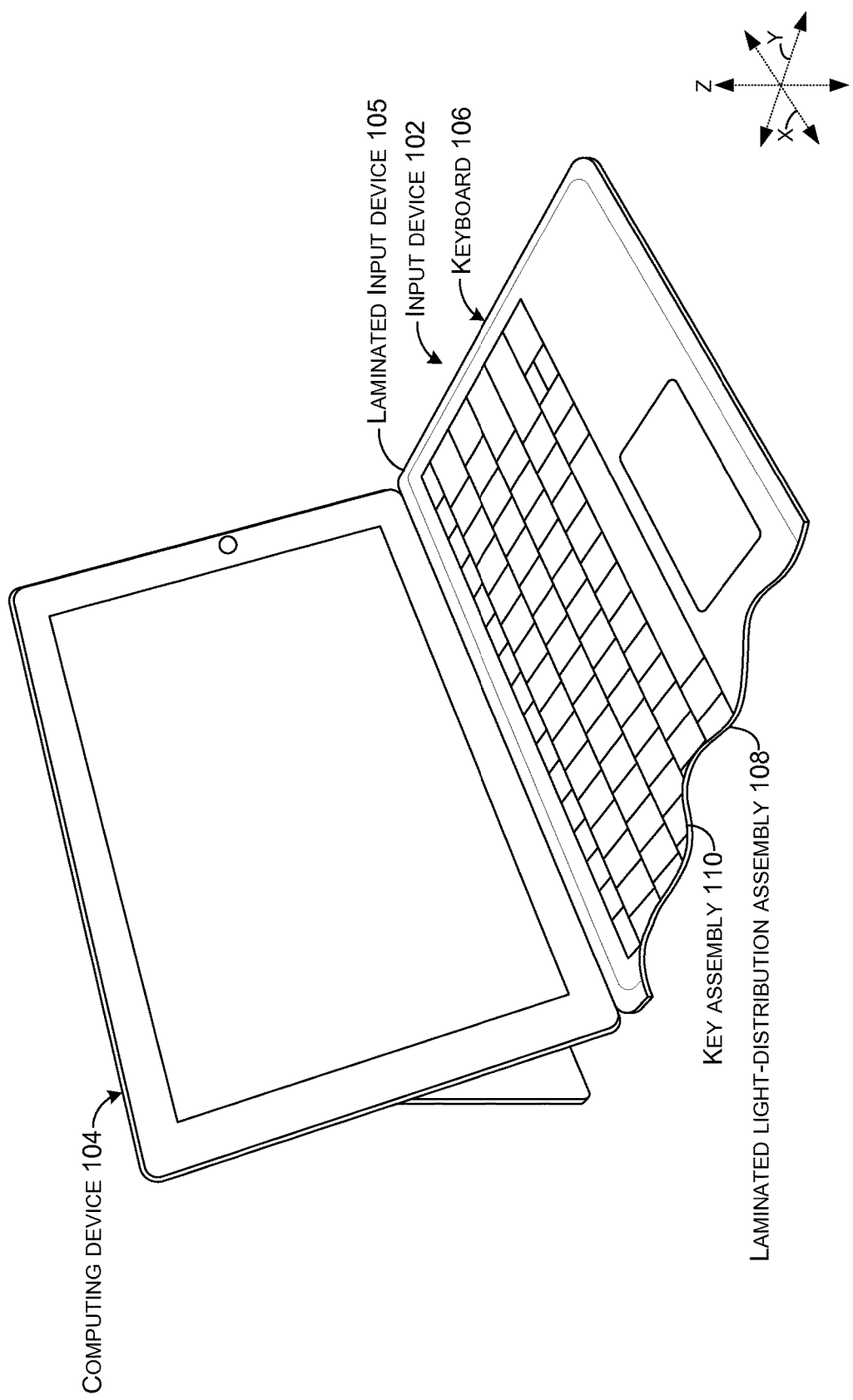
FIG. 1 is a perspective view of an example computing device and an example laminated input device that can operate cooperatively with the computing device in accordance with the present concepts.

FIG. 1 shows a partial cut-away view of an example input device 102 that can operate cooperatively with a computing device 104, such as a tablet type computing device. In some cases, the input device can be characterized as a laminated input device 105 as will be described in more detail below. In this case, the input device is manifest as a keyboard 106 that can be physically coupled and/decoupled with computing device 104. The input device can include a laminated light-distribution assembly 108 and a key assembly 110. These components can contribute to a strong input device that is relatively thin yet stiff (e.g., as thin as existing input devices but better maintains x-y planarity when subjected to stress forces). These and other aspects are discussed in more detail below. Other implementations can be manifest as freestanding input devices, such as wireless keyboards, among others.

Figure 2:
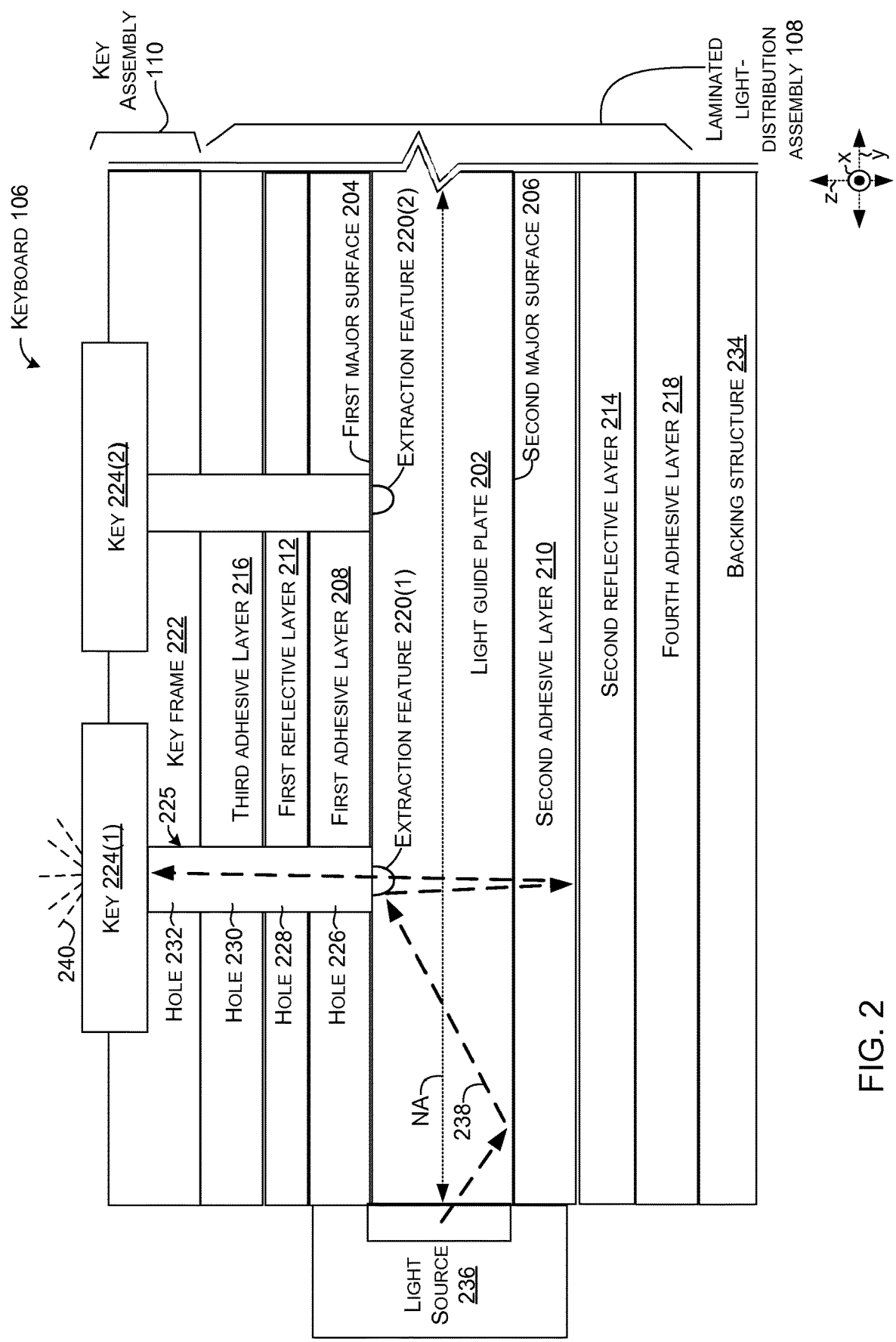
FIGS. 2-5 are sectional views of example laminated input device implementations in accordance with the present concepts.

FIG. 2 shows a partial sectional view of keyboard 106. In this example, the laminated light-distribution assembly 108 can include a light guide plate 202. The light guide plate can include first and second major surfaces 204 and 206. The laminated light-distribution assembly 108 can also include first and second adhesive layers 208 and 210 and first and second reflective layers 212 and 214 as well as third and fourth adhesive layers 216 and 218. The light guide plate 202 can further include and/or be associated with extraction features 220.

In this example, key assembly 110 can include a key frame 222 and keys (e.g., user-activatable input keys) 224. Further, the first adhesive layer 208, first reflective layer 212, third adhesive layer 216, and key frame 222 can include light passageways 225 in the form of holes 226, 228, 230, and 232, respectively, aligned between the extraction features 220 and keys 224. A Backing structure or layer 234 can be secured by fourth adhesive layer 218.

A light source 236, such as light emitting diode (LED) can emit light (represented by arrows 238) between the first and second surfaces 204 and 206 of the light guide plate 202. This light can reflect within light guide plate 202 (and/or be reflected back into the light guide plate by reflective layers 212 and/or 214) until striking extraction feature 220 which can cause the light to exit the light guide plate 202 and travel toward key 224 via holes 226-232 (e.g., the holes 226-232 are interposed between the extraction features 220 and the overlying keys 224). The light can emerge from the key 224 to create a backlight effect (e.g., lighted keyboard) 240.

Note that the light guide plate 202 can be constructed of a material or materials that have a relatively high refractive index. For example, the light guide plate can be constructed of polycarbonate, which has an index of refraction of around 1.584-1.586. Other light guide plate materials can include any suitably transparent engineering polymer—e.g. PMMA or a polyolefin, like cyclic olefin copolymer (COP), among others. Traditionally, in order to keep light within the light guide plate until the light encountered an extraction feature 220, the keyboard 106 was configured with air around the light guide plate because air has a relatively low refractive index of around 1.0003. Subsequent components were positioned around the light guide plate, but not secured to the light guide plate (or only secured in a few dispersed discreet points) to maintain the air interface with the light guide plate. Such a configuration resulted in a loose affiliation of components that when subjected to mechanical stresses operate independently of one another resulting in a floppy, noisy keyboard.

In contrast, the present implementations can leverage first and second adhesive layers 208 and 210 to secure the light guide plate to the overlying component layers (e.g., as laminated light-distribution assembly 108). The first and second adhesive layers can be selected from adhesive materials that have a relatively low refractive index. Silicone (e.g., dimethyl silicones) can provide one example of a relatively low refractive index adhesive layer with a refractive index of about 1.40. Other materials can include fluorinated materials such as those from MY Polymers of Israel. Other categories of materials can include aerogels. One implementation can employ a thin layer of aerogel and then a higher refractive index material on top to provide additional mechanical strength. Another example material can be manifest as Hydrogel, an adhesive containing water in combination with other materials resulting in a lower refractive index.

Note that the greater the difference in refractive index between the light guide plate 202 and the first and second adhesive layers 208 and 210, the more efficient the laminated light-distribution assembly tends to be at collecting and confining (and hence transmitting) light 238 from the light source 236 to the keys 224. However, lower difference materials can be utilized in some implementations. For instance, if power is not a limiting factor, then the inefficiency can be overcome by emitting more light.

The first and second adhesive layers 208 and 210 can also be optically clear to allow most of the light 238 that leaves the light guide plate 202 to pass through the adhesive layer and be reflected back toward the light guide plate by the first and/or second reflective layers 212 and/or 214. Other implementations can employ tinted or colored layers to provide unique visual effects. Alternatively or additionally, the adhesive layers could be somewhat diffuse to control the angular distribution of light from the input device.

In this specific implementation, the first and second adhesive layers 208 and 210 can secure the light guide plate 202 to the first and second reflective layers 212 and 214, respectively. In this case, the first reflective layer 212 is manifest as an opaque reflective layer, such as a specular metallic material, such as silver or aluminum or a non-metallic reflector, such as 3M brand ESR. The first reflective layer can alternatively be somewhat diffuse. The second reflective layer 214 is manifest as a diffuse reflective layer, such as a paint layer containing white pigment such as TiO2 or a previously manufactured white film material such as those offered by Kimoto Tech under the REF-white trade name. An opposing side of the first reflective layer 212 can be secured to the key frame 222 by third adhesive layer 216. Similarly, second reflective layer 214 can be secured to backing structure 234 by fourth adhesive layer 218. The third and fourth adhesive layers can be similar materials to the first and second adhesive layers. Alternatively, the third and fourth adhesive layers can be different types of adhesives that are not selected for light transparency and/or refractive index values.

In the above described configuration, the light guide plate 202, first and second adhesive layers 208 and 210, first and second reflective layers 212 and 214, and the backing structure 234 are all secured together as laminated light-distribution assembly 108. Thus, all of these components can contribute structural integrity to the laminated light-distribution assembly 108. For instance, when subjected to a three point test in the negative z reference direction, the laminated light-distribution assembly 108 can have a neutral axis (NA) at a centroid of the laminated light-distribution assembly 108. In this implementation, the neutral axis is in the light guide plate 202 such that the key frame 222, the first and third adhesive layers 208 and 216, and the first reflective layer 212 are under compression and the second and fourth adhesive layers 210 and 218 along with the second reflective layer 214 and the backing structure 234 are under tension. Thus, for keyboards of a given overall thickness in the z reference direction, the present laminated configuration can offer greater stiffness (e.g., they are stiffer) than traditional designs. Further, since the layers are laminated together, noises generated by individual layers as a user types tend to be diminished. These noises can be further diminished by including sound deadening materials in the backing layer 234. The effectiveness of sound deadening materials tends to be increased by lamination of the individual layers together and to the sound deadening materials.

Thus, when viewed from one perspective, this implementation can provide a laminated sandwich configuration. In this case, the laminated sandwich configuration is centered around the light guide plate 202 which is sandwiched between the first and second reflective layers 212 and 214 by the first and second adhesive layers 208 and 210. The laminated sandwich configuration increases overall strength and stiffness, such that the stiffness of the laminated sandwich is greater than the sum of the stiffness of these individual components.

Figure 3:
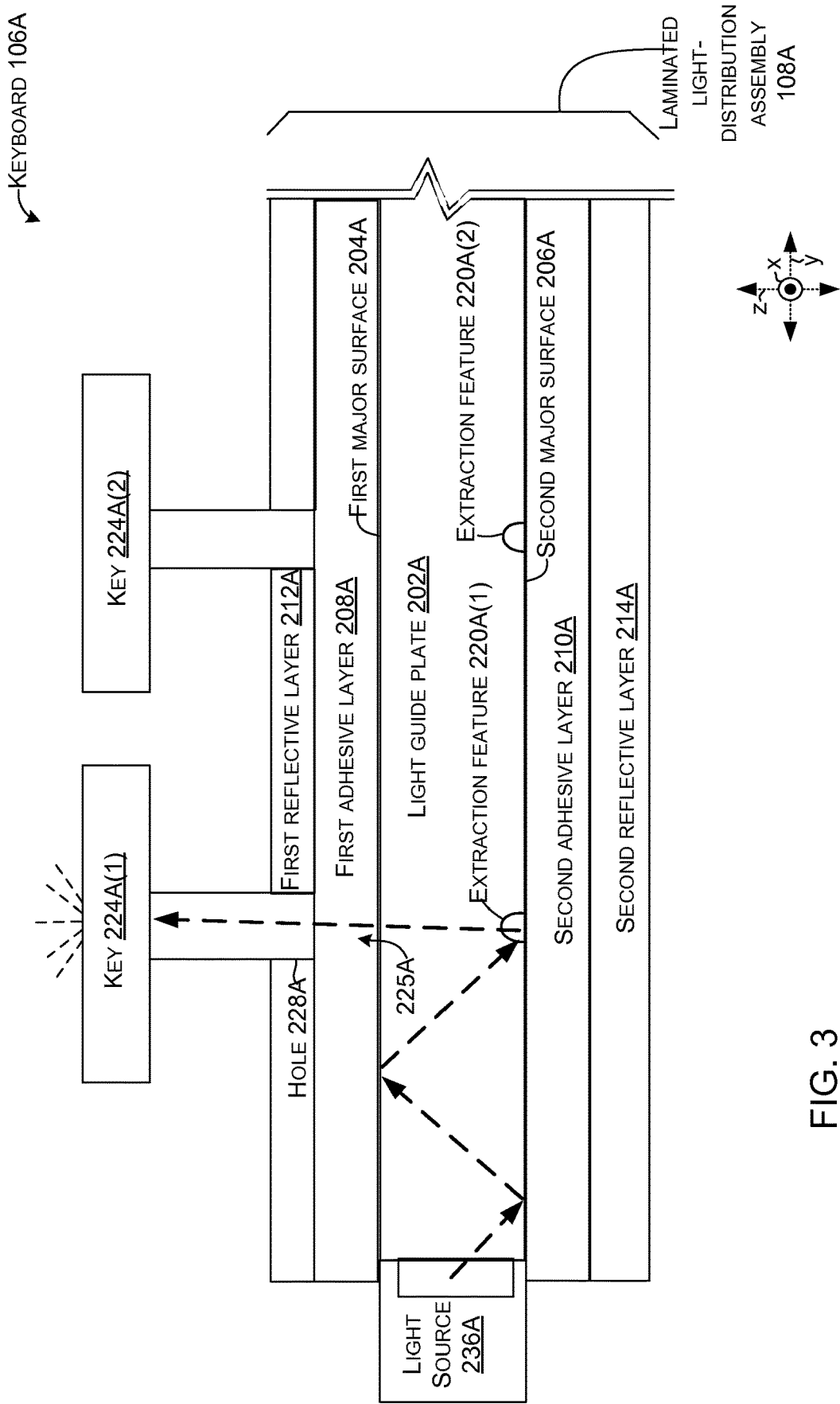

FIG. 3 shows a partial sectional view of another keyboard 106A. In this example, laminated light-distribution assembly 108A can include light guide plate 202A, first and second adhesive layers 208A and 210A, and first and second reflective layers 212A and 214A. The light guide plate is in light receiving relation with light source 236A. In this configuration, the first and second adhesive layers can facilitate light emitted by the light source entering the light guide plate. For instance, the first and second adhesive layers can facilitate a close physical coupling of the light source 236A with the light guide plate 202A. In this case, the first and second adhesive layers can extend at least partially over the light source to secure the light source against the light guide plate.

Figure 4:
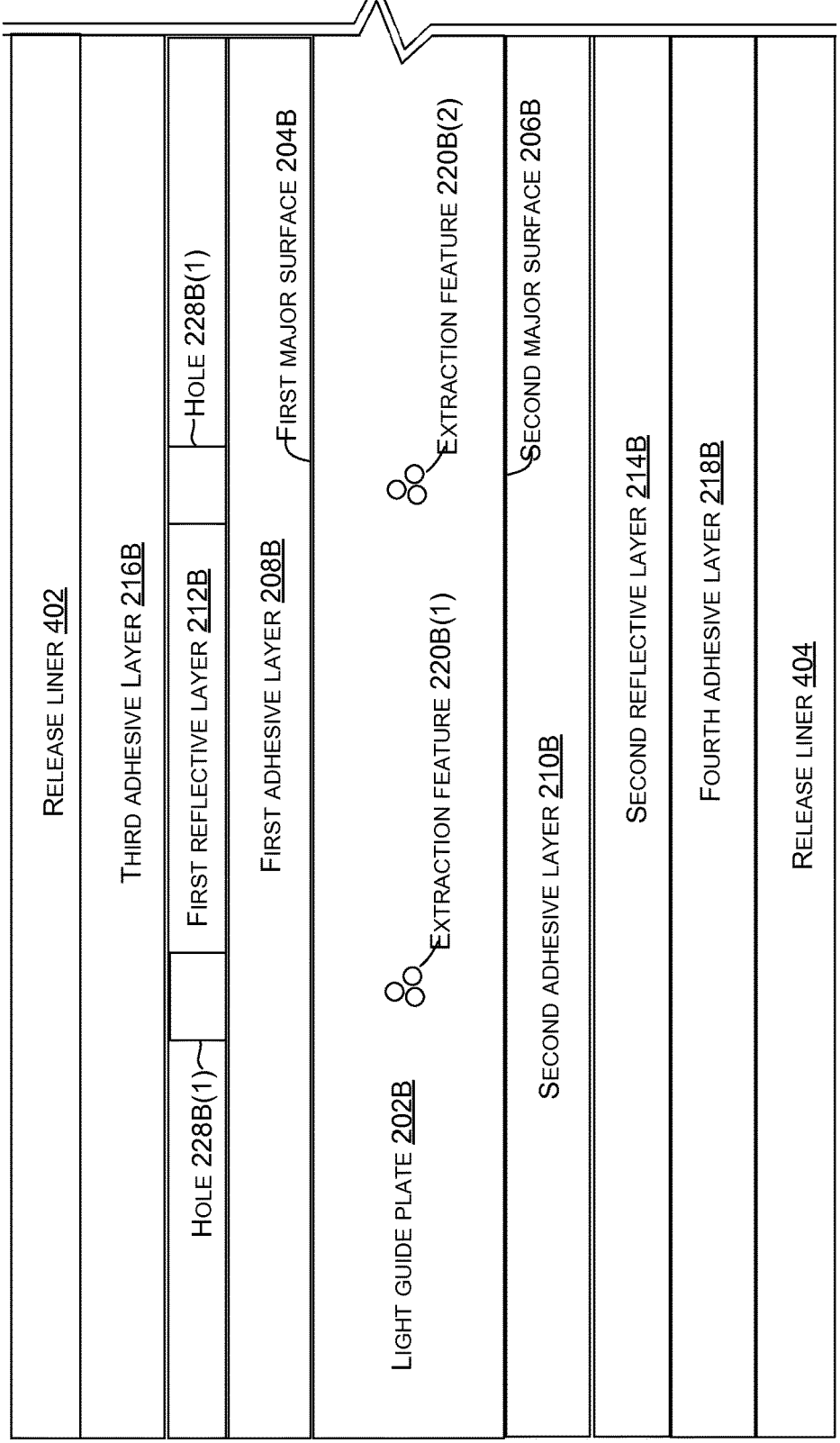

In this implementation, the extraction features 220A are positioned relative to the second major surface 206A of the light guide plate 202A. This can be contrasted to the configuration of FIG. 2 where the extraction features are positioned relative to the first major surface 204. Still another configuration is shown in FIG. 4 where the extraction features are interposed between the first and second major surfaces.

Note further that in this implementation, the first adhesive layer 208A is continuous, but can still provide light passageways 225A. In this case, the first adhesive layer can be manifest as a transmissive material that facilitates light transmission without holes. For instance, keyboard 106A includes holes 228A in the first reflective layer 212A, but the first adhesive layer can achieve adequate light transmission without holes. This configuration is enabled because the first adhesive layer is transparent to light and thus light can travel through the first adhesive layer on the way to the key 224. This continuous first adhesive layer can be contrasted to the first adhesive layer 208 of FIG. 2 which defines holes between the extraction features 220 and the keys 224. Thus, in various implementations, the coverage of the first adhesive layer over the light guide plate 202A can be at or near 100%, in other configurations, the coverage can be generally contiguous but less than 100%. For instance, the coverage could be in the range of 30% or more of the surface of the light guide plate, such as at least a majority of the surface. Despite covering less than all of the surface of the light guide plate, the contiguous nature can contribute to laminating the light guide plate to the first reflective layer and thereby reducing and/or eliminating movement between these two components, including lateral slip and separation.

In one case, the first adhesive layer 208A and/or the second adhesive layer 210A can be manifest as a single film or multiple abutting films that secure the light guide plate 202A to the first reflective layer 212A. In still another configuration where structural stiffness is desired in one direction, such as the x reference direction, but not the y reference direction, multiple non-abutting spaced-apart elongate strips of film can be positioned in the x direction between the light guide plate and the first reflective layer. Such a configuration can contribute to the keyboard 106A being relatively stiff in the x direction, but flexible (e.g., rollable) in the y direction. The second adhesive layer 210A can be handled in a similar manner to the first adhesive layer or the second adhesive layer can be different. For instance, both the first and second adhesive layers can be continuous, or the first adhesive layer can define holes (e.g., be contiguous but not continuous) whereas the second adhesive layer can be continuous.

Viewed from one perspective, laminated light-distribution assembly 108A offers greater stiffness than previous designs for a given thickness while offering similar light transmission efficiencies. The laminated light-distribution assembly can be used as illustrated and/or incorporated with additional components and/or other components.

FIG. 4 shows another laminated light-distribution assembly 108B that can be incorporated into a keyboard, such as keyboard 106 of FIGS. 1 and 2.

In this case, the extraction features 220B are formed within the light guide plate 202B (e.g., interposed between the first and second major surfaces 204B and 206B). The extraction features can be formed utilizing various techniques. For instance, the extraction features shown in FIGS. 2 and 3 can be formed utilizing various engraving or embossing techniques, such as laser etching (e.g., sub-surface laser engraving), roll embossing, or injection molding. The extraction features 220B of this implementation can be formed with sub-surface laser engraving, among other techniques. Extraction features can be manifest in various form factors, such as laser etched pits, pyramid, and/or prismatic shapes, among others. Any shape or configuration that perturbs a portion of the layer, such as the surface normal of the layer can cause the light to leak out of the light guide plate at a desired region (e.g., in line with a key).

Returning to the illustrated light-distribution assembly 108B of FIG. 4, the first and second major surfaces 204B and 206B of the light guide plate 202B are laminated to the first and second reflective layers 212B and 214B, respectively, by the first and second adhesive layers 208B and 210B, respectively. Third adhesive layer 216B is adhered to an opposing side of first reflective layer 212B, and the opposing side of second reflective layer 214B is secured to fourth adhesive layer 218B. Release liners 402 and 404 are positioned over the third and fourth adhesive layers to facilitate handling the laminated light-distribution assembly 108B until incorporation with other components, such as a key assembly and a backing structure, at which time, the release liners 402 and 404 can be removed to laminate the laminated light-distribution assembly 108B to the other components as a keyboard 106 (FIG. 1).

Figure 5:
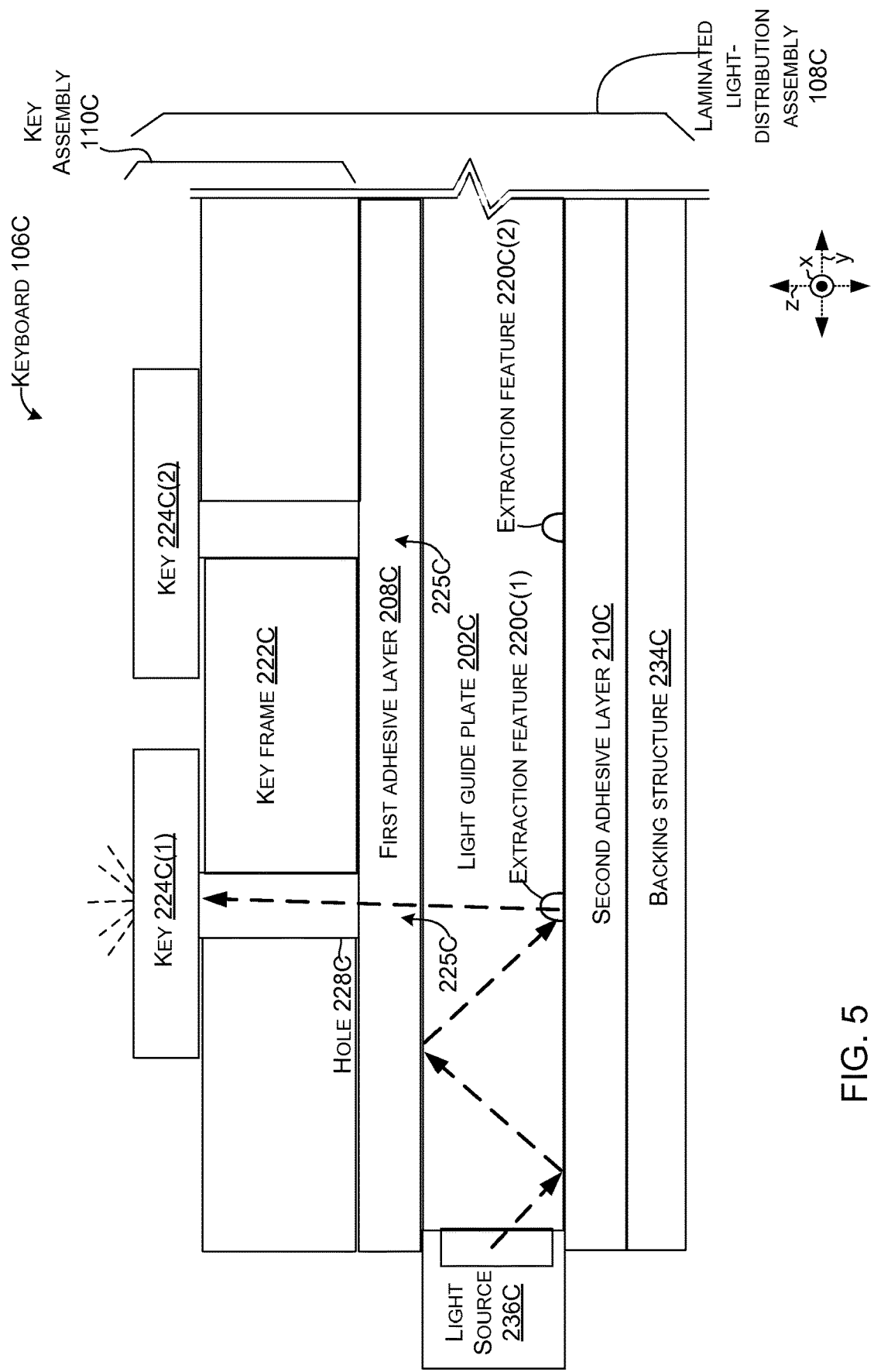

FIG. 5 shows a partial sectional view of another keyboard 106C. In this example, laminated light-distribution assembly 108C can include light guide plate 202C and first and second adhesive layers 208C and 210C. In this case, the key assembly's key frame 222C also functions as a reflective layer in between the light passageways 225C, thereby eliminating the dedicated first reflective layer shown in other implementations. Similarly, backing structure 234C can provide stiffness and function as the second reflective layer described above, thereby eliminating use of a dedicated second reflective layer.

Thus, light entering light guide plate 202C from light source 236C can bounce within light guide plate 202C and/or be returned to the light guide plate by the first adhesive layer 208C and/or the key frame 222C and/or the second adhesive layer 210C and/or the backing structure 234C except at the light passageways 225C associated with extraction features 220C. As such, from one perspective, in this implementation, the laminated light-distribution assembly 108C can be viewed as including the key assembly 110C.

Additional Examples

Various device examples are described above. Additional examples are described below. One example is a laminated input device, comprising a light guide plate, first and second adhesive layers secured to opposing surfaces of the light guide plate, and first and second reflective layers secured to the first and second adhesive layers opposite the light guide plate. The laminated input device further comprises third and fourth adhesive layers secured to the first and second reflective layers respectively, and a key assembly and a backing structure adhered over the third and fourth adhesive layers respectively, creating the laminated input device. The laminated input device has a neutral axis in a centroid of the laminated input device.

Another example can include any combination of the above and/or below examples where the first and second adhesive layers are low refractive index materials relative to the light guide plate.

Another example can include any combination of the above and/or below examples where the centroid is in the light guide plate.

Another example can include any combination of the above and/or below examples where the first and second adhesive layers are relatively optically clear and are continuous over the light guide plate, or where the first and second adhesive layers are not continuous over the light guide plate.

Another example can include any combination of the above and/or below examples where the light guide plate includes extraction features to cause light to exit at locations along the light guide plate underlying keys of the key assembly, and where the first adhesive layer defines holes aligned between the extraction features and the keys.

Another example can include any combination of the above and/or below examples where the first, second, third, and fourth adhesive layers are relatively optically clear, or where the first and second adhesive layers are relatively optically clear and where the third and fourth adhesive layers are not relatively optically clear.

Another example can include any combination of the above and/or below examples where the first and second adhesive layers are continuous over the light guide plate, or where the first adhesive layer is contiguous but not continuous over the light guide plate and the second adhesive layer is contiguous and continuous over the light guide plate, or where the first and second adhesive layers are contiguous but not continuous over the light guide plate.

Another example can include any combination of the above and/or below examples where the first and second adhesive layers are contiguous and contact at least a majority of the opposing surfaces of the light guide plate.

Another example is keyboard, comprising a light guide plate having opposing first and second major surfaces, and a first reflective layer including light passageways. The first reflective layer is secured to the first major surface by a first adhesive layer. The keyboard further comprises a second reflective layer secured to the second major surface by a second adhesive layer, and a key frame positioned over the first reflective layer that has additional light passageways that are vertically aligned with the light passageways in the first reflective layer and secured to the first reflective layer by a third adhesive layer and indirectly secured against the first major surface of the light guide plate. The keyboard further comprises user-activatable input keys positioned over the additional light passageways and the light passageways, and a light source configured to emit light between the first and second major surfaces of the light guide plate.

Another example can include any combination of the above and/or below examples where the light guide plate comprises a relatively high refractive index material.

Another example can include any combination of the above and/or below examples where the light guide plate comprises polycarbonate.

Another example can include any combination of the above and/or below examples where the first and second adhesive layers comprise a relatively low refractive index optically clear adhesive.

Another example can include any combination of the above and/or below examples where the first and second adhesive layers create a laminated sandwich configuration centered around the light guide plate that is more stiff than a sum of individual stiffnesses of the light guide plate, the first and second reflective layers, and the key frame.

Another example can include any combination of the above and/or below examples where the light guide plate further comprises extraction features that cause light to escape the light guide plate and travel through the light passageways and the additional light passageways to the user-activatable input keys.

Another example can include any combination of the above and/or below examples where the extraction features are proximate to the first major surface, proximate to the second major surface, or interposed between the first major surface and the second major surface.

Another example can include any combination of the above and/or below examples where the light passageways and the additional light passageways are holes or wherein the light passageways and the additional light passageways are materials that are transmissive materials.

Another example is a keyboard comprising a laminated light-distribution assembly, user-activatable input keys, and a light source. The laminated light-distribution assembly comprises a light guide plate having opposing first and second major surfaces and including extraction features. The laminated light-distribution assembly further comprises a first reflective layer secured to the first major surface by a first adhesive layer, the first reflective layer defining holes formed over the extraction features. The laminated light-distribution assembly further comprises a second reflective layer secured to the second major surface by a second adhesive layer. The user-activatable input keys are positioned over the holes formed in the first reflective layer. The light source is configured to emit light between the first and second major surfaces that is distributed to the input keys by the laminated light-distribution assembly.

Another example can include any combination of the above and/or below examples where the first reflective layer is manifest as an opaque reflector and the second reflective layer is manifest as a diffuse reflector.

Another example can include any combination of the above and/or below examples where the first adhesive layer defines holes that are aligned with the holes in the first reflective layer between the extraction features and the keys or where the first adhesive layer is continuous across the first major surface of the light guide plate.

Another example can include any combination of the above and/or below examples where the first adhesive layer and the second adhesive layers are manifest as optically clear films that have a lower refractive index than the light guide plate.

Another example is a laminated input device, comprising a laminated light-distribution assembly and a key assembly adhered in light receiving relation to the laminated light-distribution assembly as the laminated input device having a neutral axis in the laminated light-distribution assembly.

Another example can include any combination of the above and/or below examples where the laminated light-distribution assembly includes a light guide plate adheredly sandwiched between first and second reflective layers and wherein the neutral axis lies within the light guide plate.

Another example can include any combination of the above and/or below examples where the laminated input device further comprises a light source coupled to the laminated light-distribution assembly to deliver light to the key assembly.

CONCLUSION

Although techniques, methods, devices, systems, etc., pertaining to laminated input devices are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A laminated input device, comprising:
a laminated light-distribution assembly with a laminated sandwich configuration, the laminated light-distribution assembly comprising a light guide plate and paired layers sandwiched on opposing sides of the light guide plate such that the light guide plate defines a neutral axis of the laminated light-distribution assembly, the paired layers including paired first and second adhesive layers secured to opposing surfaces of the light guide plate, paired first and second reflective layers secured to the first and second adhesive layers opposite the light guide plate, and paired third and fourth adhesive layers secured to the first and second reflective layers respectively;
a key assembly adhered to the laminated light-distribution assembly by the third adhesive layer; and,
a backing structure adhered to the laminated light-distribution assembly by the fourth adhesive layer,
wherein the neutral axis defined by the light guide plate is in a centroid of the laminated light-distribution assembly,
wherein the laminated sandwich configuration is configured to contribute to stiffness of the laminated input device, and
wherein, in an instance where a downward force is applied to the laminated input device, the neutral axis is in the light guide plate such that the first and third adhesive layers and the first reflective layer are under compression, and the second and fourth adhesive layers and the second reflective layer are under tension.

2. The laminated input device of claim 1, wherein the light guide plate includes extraction features to cause light to exit at locations along the light guide plate underlying keys of the key assembly.

3. The laminated input device of claim 2, wherein the first adhesive layer, the first reflective layer, and the third adhesive layer define holes aligned between the extraction features and keys of the key assembly.

4. The laminated input device of claim 3, wherein the key assembly comprises a key frame having further holes aligned between the extraction features and the keys of the key assembly.

5. The laminated input device of claim 4, further comprising a light source configured to emit light into the light guide plate.

6. The laminated input device of claim 2, wherein the extraction features are located in an upper portion of the light guide plate proximate the first adhesive layer.

7. The laminated input device of claim 1, wherein the first and second adhesive layers are low refractive index materials relative to the light guide plate.

8. The laminated input device of claim 1, wherein the laminated sandwich configuration is configured to contribute to diminishing keyboard sounds during use of the laminated input device.

9. A keyboard, comprising:
a light guide plate having opposing first and second major surfaces, the light guide plate defining a neutral axis of the keyboard;

a first reflective layer secured to the first major surface by a first adhesive layer, the first reflective layer including light passageways;

a second reflective layer secured to the second major surface by a second adhesive layer;

a key frame positioned over the first reflective layer and having additional light passageways that are vertically aligned with the light passageways in the first reflective layer, the key frame secured to the first reflective layer by a third adhesive layer and indirectly secured against the first major surface of the light guide plate, the key frame supporting user-activatable input keys of the keyboard such that the first and second reflective layers and the first and second adhesive layers maintain planarity parallel to the neutral axis of the keyboard during activation of the user-activatable input keys; and, a light source configured to emit light between the first and second major surfaces of the light guide plate such that some of the light crosses the neutral axis of the keyboard on a route toward the user-activatable input keys.

10. The keyboard of claim 9, wherein the light guide plate further comprises extraction features that cause light to escape the light guide plate and travel through the light passageways and the additional light passageways to the user-activatable input keys.

11. The keyboard of claim 10, wherein the extraction features are proximate to the first major surface and the first reflective layer.

12. The keyboard of claim 10, wherein the light passageways and the additional light passageways are holes or wherein the light passageways and the additional light passageways are materials that are transmissive materials.

13. The keyboard of claim 9, wherein the light guide plate comprises a high refractive index material.

14. The keyboard of claim 13, wherein the light guide plate comprises polycarbonate.

15. The keyboard of claim 9, wherein the first and second adhesive layers comprise a low refractive index optically clear adhesive.

16. The keyboard of claim 9, wherein the first and second adhesive layers create a laminated sandwich configuration centered around the light guide plate that is more stiff than a sum of individual stiffnesses of the light guide plate, the first and second reflective layers, and the key frame.

17. A keyboard, comprising:
a laminated light-distribution assembly, comprising:
a light guide plate having opposing first and second major surfaces and including extraction features positioned proximate to the first major surface, the light guide plate defining a neutral axis of the laminated light-distribution assembly that passes through the light guide plate,
a first reflective layer secured to the first major surface by a first adhesive layer, the first reflective layer defining holes formed over the extraction features, and
a second reflective layer secured to the second major surface by a second adhesive layer;
a key assembly secured to the first reflective layer by a third adhesive layer, the key assembly including user-activatable input keys positioned over the holes formed in the first reflective layer;
a backing structure adhered to the second reflective layer by a fourth adhesive layer; and,
a light source configured to emit light between the first and second major surfaces that is distributed to the user-activatable input keys by the laminated light-distribution assembly such that at least some of the light crosses the neutral axis between emission from the light source and extraction at an individual extraction feature,
wherein, when the keyboard is subjected to stress forces, the laminated light-distribution assembly provides stiffness to the keyboard along a plane that is parallel to the neutral axis that passes through the light guide plate.

18. The keyboard of claim 17, wherein the first reflective layer is manifest as an opaque reflector and the second reflective layer is manifest as a diffuse reflector.

19. The keyboard of claim 17, wherein the first and third adhesive layers define holes that are aligned with the holes in the first reflective layer between the extraction features and the user-activatable input keys or wherein the first adhesive layer is continuous across the first major surface of the light guide plate.

20. The keyboard of claim 17, wherein the first adhesive layer and the second adhesive layer are manifest as optically clear films that have a lower refractive index than the light guide plate.

* * * * *